United States Patent
Mossoba et al.

(10) Patent No.: US 11,625,657 B2
(45) Date of Patent: Apr. 11, 2023

(54) UTILIZING A MACHINE LEARNING MODEL TO CROWDSOURCE FUNDS FOR PUBLIC SERVICES

(71) Applicant: Capital One Services, LLC, McLean, VA (US)

(72) Inventors: Michael Mossoba, Arlington, VA (US); Abdelkader M'Hamed Benkreira, New York, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 5 days.

(21) Appl. No.: 17/304,866

(22) Filed: Jun. 28, 2021

(65) Prior Publication Data

US 2021/0342762 A1    Nov. 4, 2021

Related U.S. Application Data

(63) Continuation of application No. 16/744,999, filed on Jan. 16, 2020, now Pat. No. 11,049,054.

(51) Int. Cl.
| | |
|---|---|
| *G06Q 10/06* | (2012.01) |
| *G06Q 40/00* | (2012.01) |
| *G06N 3/08* | (2006.01) |
| *G06F 16/587* | (2019.01) |
| *G06Q 10/0631* | (2023.01) |
| *G06Q 40/12* | (2023.01) |

(52) U.S. Cl.
CPC ..... *G06Q 10/06313* (2013.01); *G06F 16/587* (2019.01); *G06N 3/08* (2013.01); *G06Q 40/12* (2013.12)

(58) Field of Classification Search
CPC ................................................. G06Q 10/06313
See application file for complete search history.

(56) References Cited

U.S. PATENT DOCUMENTS

| | | |
|---|---|---|
| 7,945,470 B1 | 5/2011 | Cohen et al. |
| 11,049,054 B1 | 6/2021 | Mossoba |
| 2010/0332281 A1 | 12/2010 | Horvitz et al. |

(Continued)

OTHER PUBLICATIONS

Dehner B., "Strong Communities, More Efficient Government", Oct. 12, 2017, 8 pages, Retrieved from the internet [URL: https://seeclickfix.com/].

(Continued)

*Primary Examiner* — Andre D Boyce
(74) *Attorney, Agent, or Firm* — Harrity & Harrity, LLP

(57) ABSTRACT

A device may provide, to a user device, task data identifying tasks to be performed, and may receive, from the user device, a selection of a particular task from the tasks to be performed. The device may identify cameras associated with a particular task location, and may receive, from the user device, data identifying a location of the user device. The device may determine that the location of the user device matches the particular task location, and may receive, from the user device, task image data identifying images of the particular task location. The device may access, from the cameras, camera data identifying images of the particular task location, and may process the task image data and the camera data, with a machine learning model, to determine performance data associated with performance of the particular task. The device may perform one or more actions based on the performance data.

20 Claims, 13 Drawing Sheets

(56) References Cited

U.S. PATENT DOCUMENTS

| | | |
|---|---|---|
| 2012/0143952 A1 | 6/2012 | Von Graf |
| 2014/0359725 A1 | 12/2014 | Anson |
| 2015/0066919 A1 | 3/2015 | Park et al. |
| 2015/0317582 A1 | 11/2015 | Nath et al. |
| 2016/0063440 A1 | 3/2016 | Webb |
| 2016/0117948 A1 | 4/2016 | Kraemer et al. |

OTHER PUBLICATIONS

Law E., "Defining (Human) Computation," Carnegie Mellon University, CHI 2011, May 7-12, 2011.
Orso A., "How Thousands of Private Cameras Help Philly Police Solve Crimes (and maybe you should sign up)", Jul. 6, 2015, 3 pages.
TaskRabbit, "Help Around The Home, At Your Fingertips", 2010, 19 pages.
Yang J., et al., "Tracking Multiple Workers on Construction Sites Using Video Cameras," Advanced Engineering Informatics, Nov. 2010, vol. 24 (4), pp. 428-434.

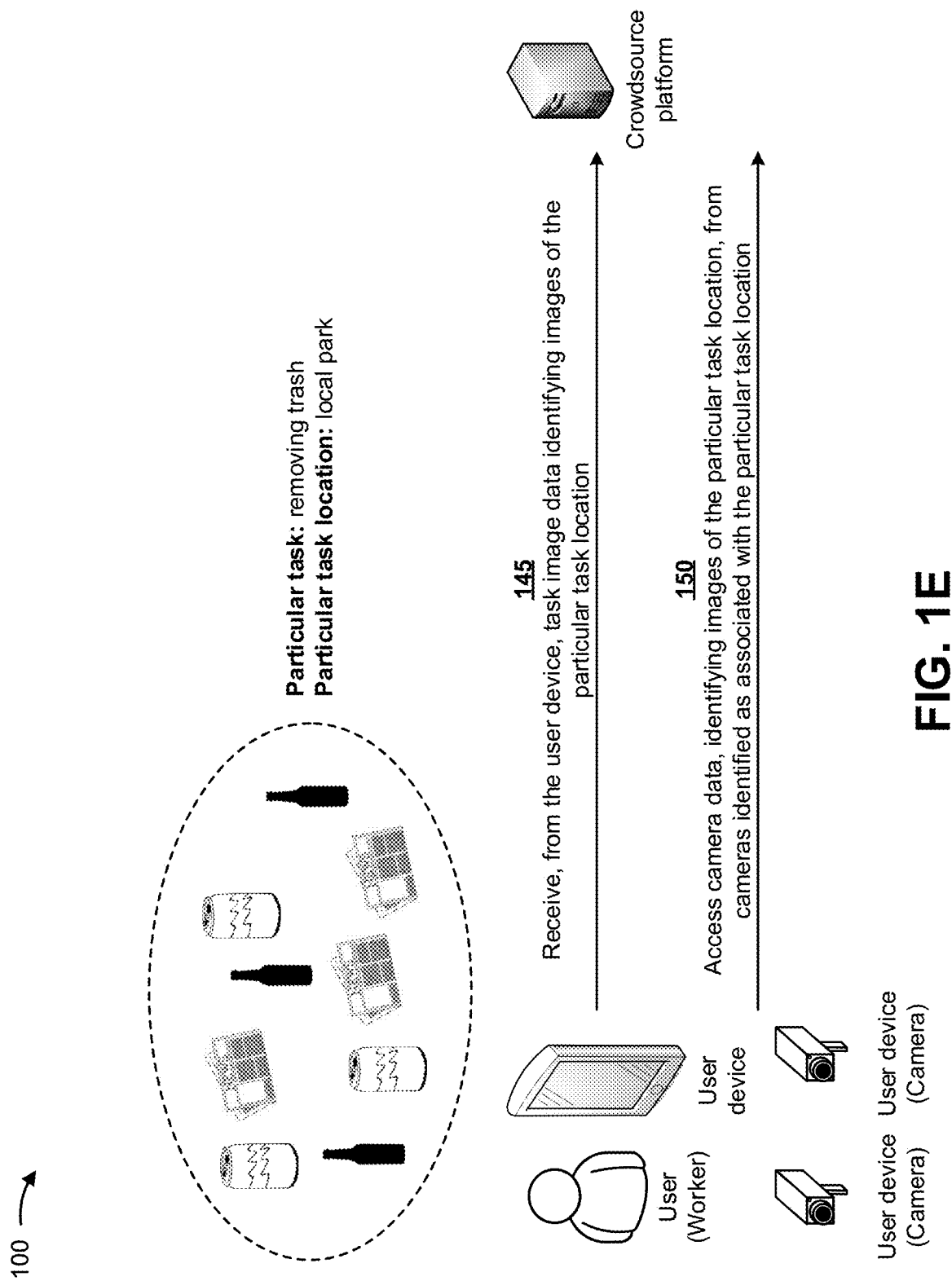

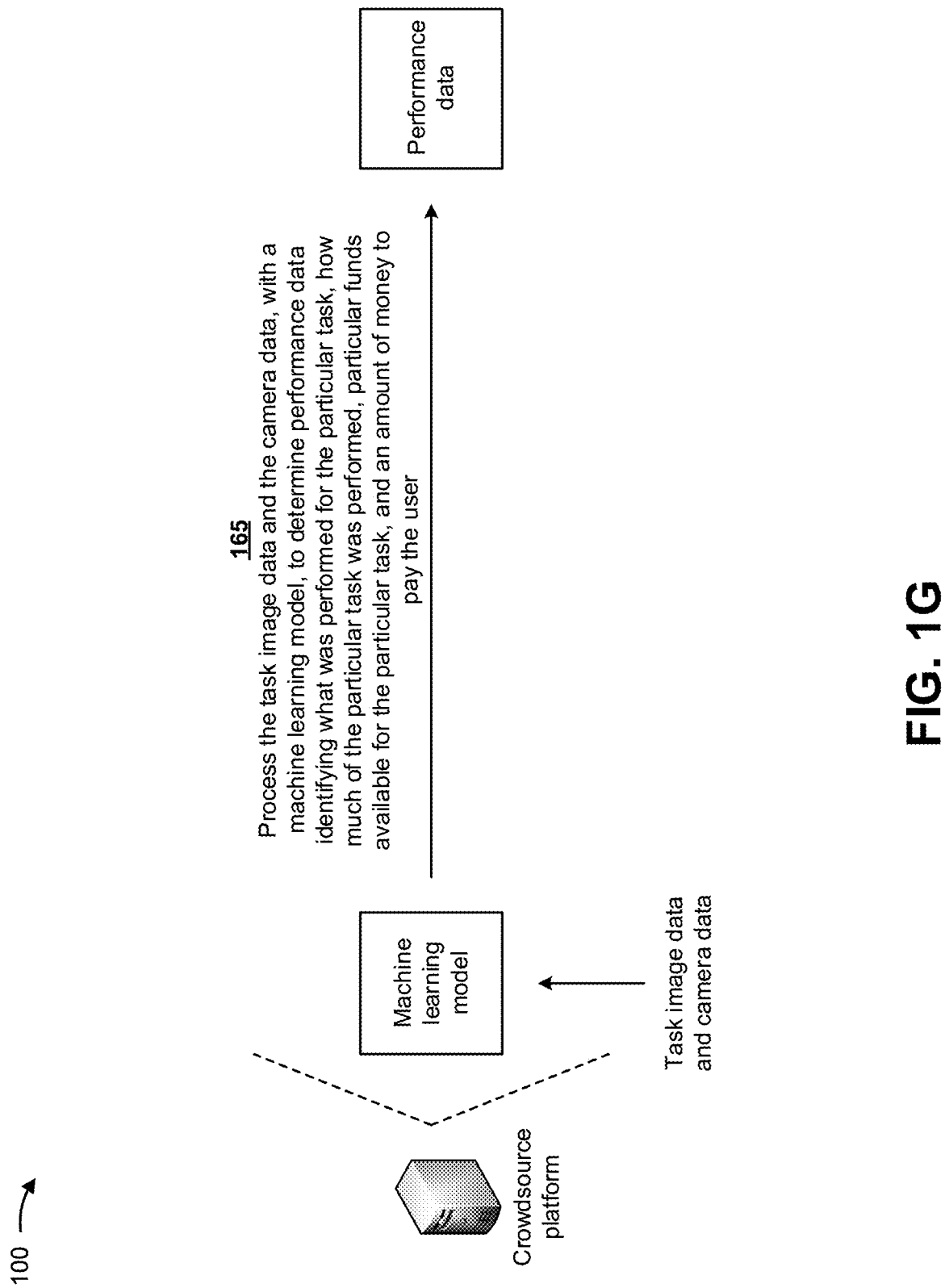

UTILIZING A MACHINE LEARNING MODEL TO CROWDSOURCE FUNDS FOR PUBLIC SERVICES

RELATED APPLICATION

This application is a continuation of U.S. patent application Ser. No. 16/744,999, filed Jan. 16, 2020 (now U.S. Pat. No. 11,049,054), which is incorporated herein by reference in its entirety.

BACKGROUND

Public services, such as snow removal, trash removal from parks, improving communities, and/or the like, may be provided by governments to people living within jurisdictions of the governments. Performance of such public services by the governments requires funding by the governments (e.g., typically raised via taxes).

SUMMARY

According to some implementations, a method may include providing, to a user device, task data identifying tasks to be performed, and receiving, from the user device, a selection of a particular task from the tasks to be performed, wherein the particular task is to be performed by a user of the user device. The method may include identifying one or more cameras associated with a particular task location, wherein the particular task location includes a geographical location where the particular task is to be performed, and receiving, from the user device, data identifying a location of the user device. The method may include determining that the location of the user device matches the particular task location, and receiving, from the user device, task image data identifying images of the particular task location. The method may include accessing, from the one or more cameras identified as associated with the particular task location, camera data identifying images of the particular task location, and processing the task image data and the camera data, with a machine learning model, to determine performance data, wherein the performance data includes data identifying at least two of what was performed for the particular task, how much of the particular task was performed by the user, particular funds available for the particular task, or an amount of money to pay the user. The method may include performing one or more actions based on the performance data.

According to some implementations, a device may include one or more memories; and one or more processors, communicatively coupled to the one or more memories, configured to provide, to a plurality of user devices, task data identifying tasks to be performed, and receive, from the plurality of user devices and based on the task data, funding data associated with performance of the tasks, wherein the funding data identifies funds to allocate for performance of the tasks. The one or more processors may be configured to receive, from one or more server devices, the funds based on the funding data, and provide, to a particular user device, the task data identifying the tasks to be performed. The one or more processors may be configured to receive, from the particular user device, a selection of a particular task from the tasks to be performed, and identify one or more cameras associated with a particular task location, wherein the particular task location includes a geographical location where the particular task is to be performed. The one or more processors may be configured to receive, from the particular user device, data identifying a location of the particular user device, and determine that the location of the particular user device matches the particular task location. The one or more processors may be configured to receive, from the particular user device, task image data identifying images of the particular task location, and access, from the one or more cameras, camera data identifying images of the particular task location. The one or more processors may be configured to process the task image data and the camera data, with a machine learning model, to determine performance data, wherein the performance data includes data identifying what was performed for the particular task, how much of the particular task was performed, particular funds available for the particular task, and an amount of money to pay for performance of the particular task. The one or more processors may be configured to perform one or more actions based on the performance data.

According to some implementations, a non-transitory computer-readable medium may store one or more instructions that, when executed by one or more processors of a device, may cause the one or more processors to receive, from a user device, a selection of a particular task from tasks to be performed, and identify one or more cameras associated with a particular task location, wherein the particular task location includes a geographical location where the particular task is to be performed. The one or more instructions may cause the one or more processors to receive, from the user device, data identifying a location of the user device, and determine that the location of the user device matches the particular task location. The one or more instructions may cause the one or more processors to receive, from the user device, task image data identifying images of the particular task location, and access, from the one or more cameras, camera data identifying images of the particular task location. The one or more instructions may cause the one or more processors to process the task image data and the camera data, with a model, to determine performance data. The model may be trained, with historical task image data and historical camera data associated with performance of a plurality of tasks, to determine predicted performance data, and the performance data may include data identifying what was performed for the particular task, how much of the particular task was performed, particular funds available for the particular task, and an amount of money to pay for performance of the particular task. The one or more instructions may cause the one or more processors to perform one or more actions based on the performance data.

BRIEF DESCRIPTION OF THE DRAWINGS

FIGS. 1A-1H are diagrams of one or more example implementations described herein.

DETAILED DESCRIPTION

Figure 1A:
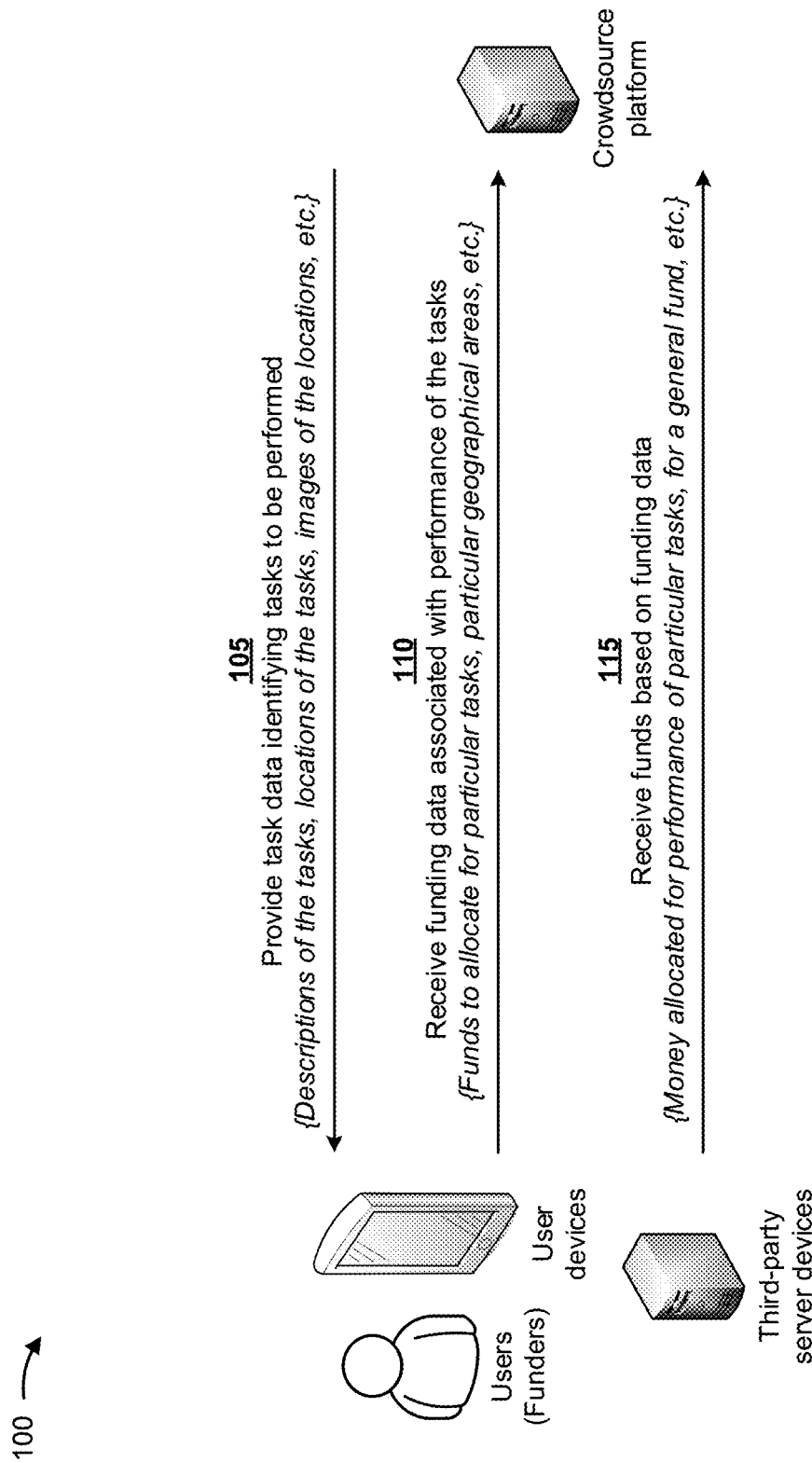

The following detailed description of example implementations refers to the accompanying drawings. The same reference numbers in different drawings may identify the same or similar elements.

Significant resources (e.g., processing resources, memory resources, network resources, transportation resources, taxpayers' money, and/or the like) of a government are wasted tracking, managing, and/or performing public services. The tracking, managing, and/or performing of the public services may be complicated, error prone, haphazard, and/or incomplete. Furthermore, several governments lack the resources to perform all public services required by people within jurisdictions of the governments. For example, a city typically lacks the resources to remove snow from all streets and/or sidewalks of the city during a snowstorm. This may result in safety issues for citizens of the city.

Some implementations described herein provide a crowdsource platform that utilizes a machine learning model to crowdsource funds for public services. For example, the crowdsource platform may provide, to a user device, task data identifying tasks to be performed, and may receive, from the user device, a selection of a particular task from the tasks to be performed, wherein the particular task is to be performed by a user of the user device. The crowdsource platform may identify one or more cameras associated with a particular task location, wherein the particular task location includes a geographical location where the particular task is to be performed, and may receive, from the user device, data identifying a location of the user device. The crowdsource platform may determine that the location of the user device matches the particular task location, and may receive, from the user device, task image data identifying images of the particular task location. The crowdsource platform may access, from the one or more cameras identified as associated with the particular task location, camera data identifying images of the particular task location, and may process the task image data and the camera data, with a machine learning model, to determine performance data. The performance data may include data identifying what was performed for the particular task, how much of the particular task was performed by the user, particular funds available for the particular task, an amount of money to pay the user, and/or the like. The crowdsource platform may perform one or more actions based on the performance data.

In this way, the crowdsource platform enables a government to provide public services without wasting additional resources (e.g., processing resources, memory resources, network resources, manufacturing resources, transportation resources, and/or the like) for tracking, managing, and/or performing the public services. The crowdsource platform makes tracking, managing, and/or performing public services less complicated, reduces errors, provides systematic and complete results, and/or the like. Furthermore, the crowdsource platform enables the government to provide safer communities to people within the jurisdiction of the government.

FIGS. 1A-1H are diagrams of one or more example implementations 100 described herein. As shown in FIG. 1A, user devices and third-party server devices may be associated with a crowdsource platform. As further shown, the user devices may be associated with users or funders (e.g., governments, merchants, communities, individuals, and/or the like) that provide funds for performance of tasks. The third-party server devices may be associated with merchants, financial institutions (e.g., banks), and/or the like, that may hold the funds, manage the funds, disperse the funds, and/or the like.

As further shown in FIG. 1A, and by reference number 105, the crowdsource platform may provide, to the user devices, task data identifying tasks to be performed. For example, the task data may include data identifying the tasks to be performed (e.g., removal of trash from parks, snow removal from sidewalks, removal of trash from streets, and/or the like), locations of where the tasks are to be performed, images of the locations, sensor data associated with the locations, scheduling data associated with the tasks, and/or the like.

As further shown in FIG. 1A, and by reference number 110, the crowdsource platform may receive, from the user devices, funding data associated with performance of the tasks. For example, the funding data may include data identifying funds to allocate for performance of the tasks (e.g., funds to allocate for a particular task, funds to allocate for a particular type of task, funds to allocate for tasks associated with a particular geographical area, funds to allocate for a particular community or cause, and/or the like). In some implementations, the crowdsource platform may periodically receive the funding data from the third-party server devices, may continuously receive the funding data from the third-party server devices, and/or the like. In some implementations, the crowdsource platform may store the funding data in a data structure (e.g., a database, a table, a list, and/or the like) associated with the crowdsource platform.

As further shown in FIG. 1A, and by reference number 115, the crowdsource platform may receive, from the third-party server devices, funds based on the funding data. In some implementations, the crowdsource platform may maintain the funds rather than obtaining the funds from third-party server devices. The crowdsource platform may receive or maintain funds (e.g., money) allocated for performance of particular tasks, funds allocated for a general fund, funds allocated for a particular community or cause, and/or the like. In some implementations, the crowdsource platform may evenly allocate the funds for the tasks to be performed. Additionally, or alternatively, the crowdsource platform may prioritize the funds, based on amounts in the funds, for the tasks to be performed.

In some implementations, there may be hundreds, thousands, and/or the like, of user devices and/or third-party server devices that produce thousands, millions, billions, and/or the like, of data points provided in the task data and/or the funding data. In this way, the analytical platform may handle thousands, millions, billions, and/or the like, of data points within a period of time (e.g., daily, weekly, monthly), and thus may provide "big data" capability.

Figure 1B:
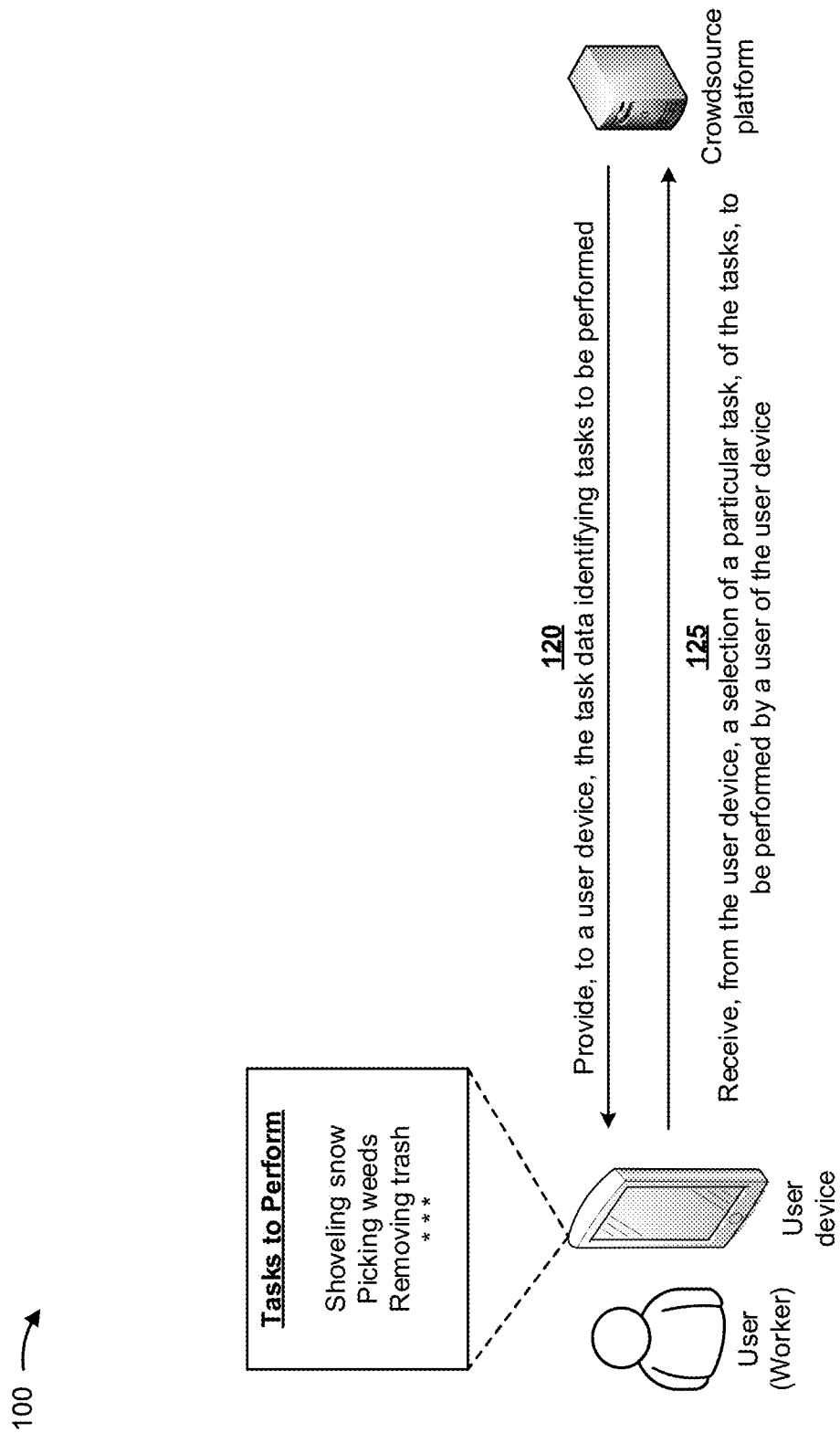

As shown in FIG. 1B, a user device may be associated with the crowdsource platform and a user (e.g., a worker) who may perform one or more of the tasks. For example, the user device may be a smart phone operated by the user, and may include an application that displays a user interface associated with the crowdsource platform. The user may have previously installed the application, accessed a website, and/or the like, and registered an account with the crowdsource platform (e.g., including providing basic identification information, contact information, tax information, and/or the like). This may permit the user to thereafter access the crowdsource platform via the application (e.g., by logging into the application, the website, and/or the like).

As shown further shown in FIG. 1B, and by reference number 120, the crowdsource platform may provide, to the user device, the task data identifying the tasks to be performed (e.g., tasks for which funds have been allocated, as described above in connection with FIG. 1A). For example, the tasks may include shoveling snow, picking weeds, removing trash, and/or the like. The user device may display the task data to the worker via a user interface. In some implementations, the user device may display, in association with each task, an amount of money that the user will be paid upon completing the task. In some implementations, the identified tasks may include all tasks for which funds have been allocated. Alternatively, the identified tasks may be limited based on additional factors. For example, the crowdsource platform may prevent some tasks from being listed, such as tasks that are not appropriate for the season (e.g., shoveling snow during non-winter months), tasks unable to be performed by the user, and/or the like. As another example, the worker may have previously selected one or more particular tasks (e.g., types of tasks, locations of tasks, times of tasks, etc.) that the user is willing to perform, and the crowdsource platform may provide, to the user device, task data identifying the tasks to be performed based on the information indicating the particular tasks that the user is willing to perform (e.g., limited to the particular tasks previously selected by the user).

In some implementations, the crowdsource platform may automatically identify tasks (e.g., trash removal, snow removal, graffiti removal, weed removal, and/or the like) to be completed based on sensor data received by the crowdsource platform. The sensor data may include data indicating how full a trash can is, a quantity of trash in a park (e.g., based on image recognition of trash in images of the park), a quantity of snow to remove from a street (e.g., based on images of the street), graffiti to remove from a building (e.g., based on images of the building), weeds to be removed from a vacant lot (e.g., based on images of the vacant lot), and/or the like. In this way, the crowdsource platform may automatically create the list of tasks to be performed based on sensor data at various locations.

As further shown in FIG. 1B, and by reference number 125, the crowdsource platform may receive, from the user device, a selection of a particular task, of the tasks, to be performed by the user of the user device (e.g., removing trash from a local park). In some implementations, the user device may display, via a user interface, a list of the tasks provided in the task data, and the user may utilize the user interface to select the particular task from the list of tasks. The user device may provide information indicating selection of the particular task to the crowdsource platform. For example, the user device may display a list of tasks that includes shoveling snow, picking weeds, and removing trash, and the user may select removing trash from the list. In this example, the crowdsource platform may receive, from the user device, information indicating selection of removing trash as the particular task.

In some implementations, the user may provide an indication that the user is willing to perform the particular task for free, for an amount of money less than an amount requested by the crowdsource platform, and/or the like. Additionally, or alternatively, the crowdsource platform may not specify an amount of money to be paid for performing the task (or may provide only a suggested amount), and the user may submit a bid. The crowdsource platform may receive bids from multiple workers for a particular task, and may compare the bids. The crowdsource platform may award the particular task to the worker that submitted a lowest bid, may award the particular task based on the bid and additional factors (e.g., a time of completion, worker reliability, etc.), and/or the like.

In some implementations, a user may propose to perform a task that has not been identified by the crowdsource platform. For example, the user may identify a parking lot that needs to be cleaned, may capture images of the parking lot, and may provide the images to the crowdsource platform. The crowdsource platform may add cleaning the parking lot as a task to be performed, may decline the offer to perform the task, and/or the like. In some implementations, the user may propose an amount of money that the crowdsource platform should pay for performing an unidentified task. Additionally, or alternatively, the crowdsource platform may determine, either independently or based on the proposed amount, an amount of money that the user will be paid. In some implementations, a user may proactively perform a task that has not been identified by the crowdsource platform, may provide images of the task location captured before, during, and/or after performance of the unidentified task to the crowdsource platform, and may solicit payment from the crowdsource platform. The crowdsource platform may determine whether to pay the user for performance of the unidentified task.

Figure 1C:
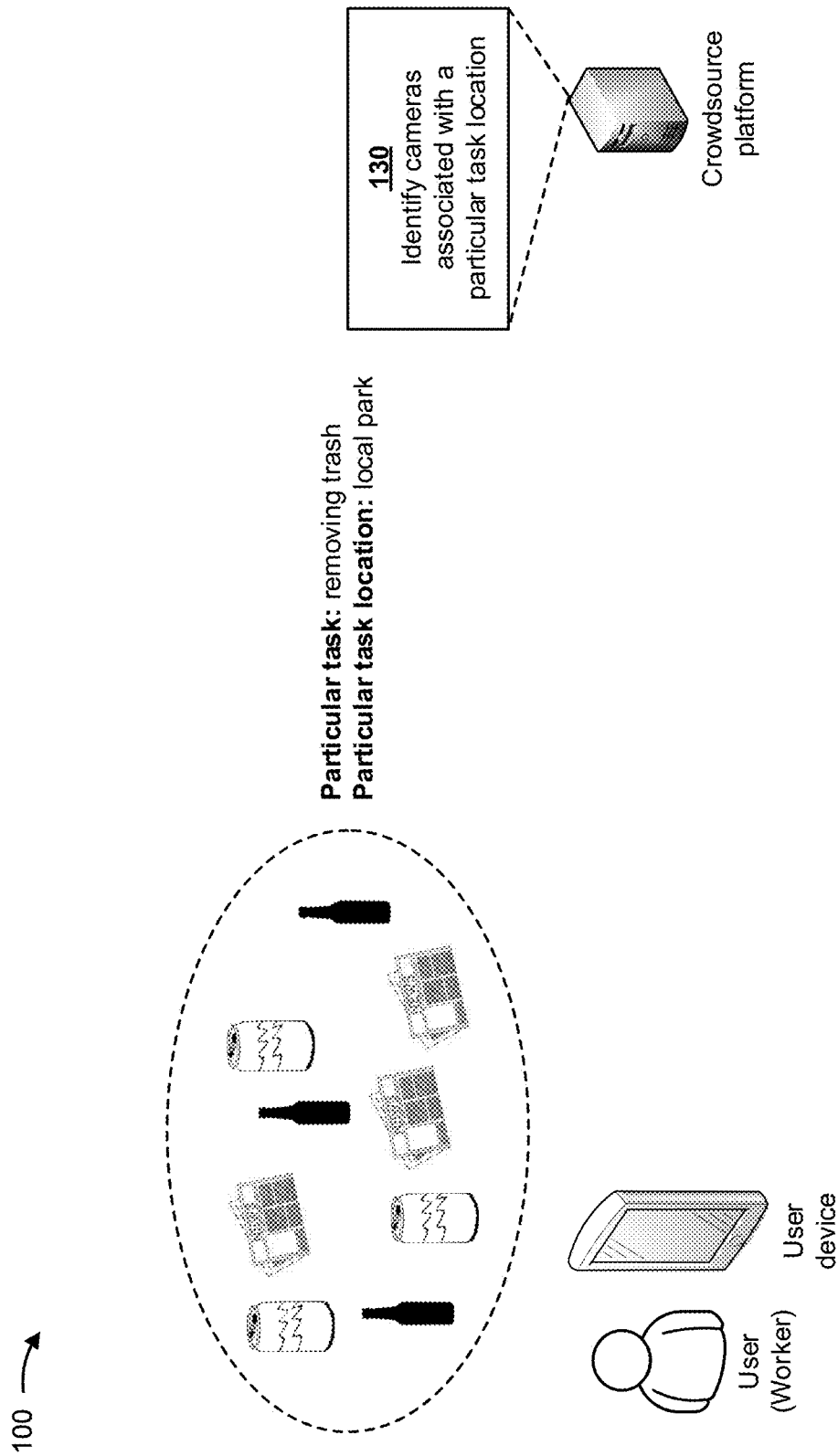

As shown in FIG. 1C, and by reference number 130, the crowdsource platform may identify cameras associated with a particular task location. In some implementations, the particular task location may include a geographical location where the particular task (e.g., the task selected by the user) is to be performed. For example, as shown in FIG. 1C, the particular task location may be a local park. As other examples, the particular task location may be one or more portions of a roadway, a sidewalk, a trail, a common area, a facility, a landmark, and/or the like. The particular task location may be part of a public space, a private space, a business, a community, and/or the like.

The cameras associated with the particular task location may be, for example, cameras at or near the particular task location, at a position within range of the particular task location (e.g., such that images captured by the cameras have sufficient resolution for the crowdsource platform to accurately identify the particular task location, the worker, the particular task, performance of the particular task, and/or the like), and/or the like. In some implementations, the cameras may be associated with (e.g., owned by, managed by, maintained by, and/or the like) the crowdsource platform, a government entity associated with the crowdsource platform, a business entity associated with the crowdsource platform, a private entity associated with the crowdsource platform, and/or the like. The cameras may be installed for the purpose of monitoring performance of tasks as described herein, may have been previously installed for purposes other than monitoring performance of tasks as described herein, and/or the like. In some implementations, the cameras may be provided on unmanned aerial vehicles (UAVs) or drones that may be dispatched by the crowdsource platform to the particular task location when image data associated with the particular location is unavailable, in addition to image data associated with the particular location, and/or the like.

Figure 1D:
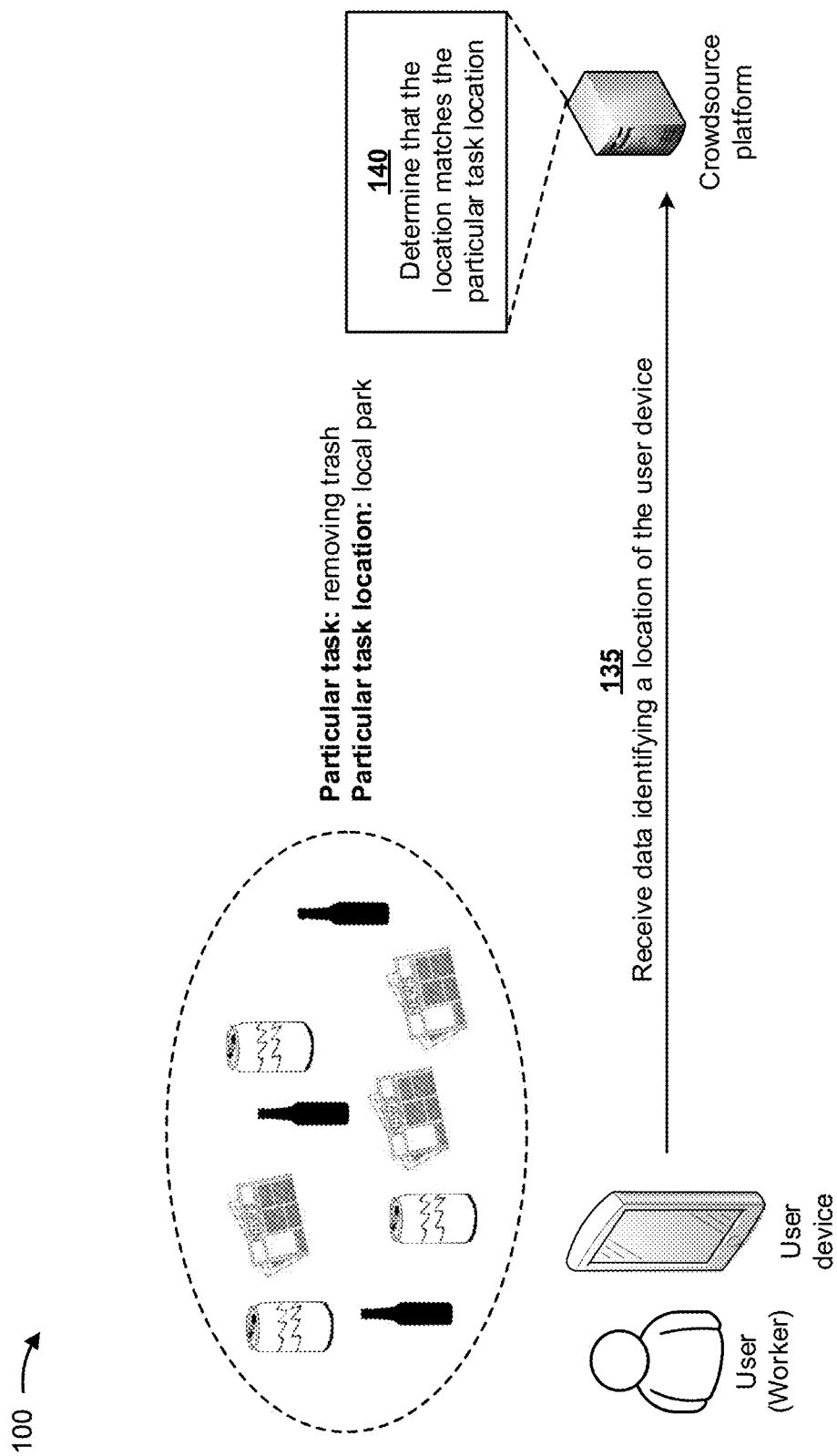

As shown in FIG. 1D, and by reference number 135, the crowdsource platform may receive data identifying a location of the user device. For example, the crowdsource platform may receive the data identifying the location from the user device of the user that selected the particular task (e.g., as determined by a global positioning system (GPS) component of the user device). In some implementations, the user may cause the user device to provide the data identifying the location of the user device to the crowdsource platform (e.g., via a user interface associated with the crowdsource platform). Additionally, or alternatively, the user device may automatically provide the data identifying the location of the user device to the crowdsource platform (e.g., based on a current time corresponding to a time for which the particular task is scheduled, based on the user device entering a vicinity of the particular task location, and/or the like). Additionally, or alternatively, the crowdsource platform may automatically obtain the data identifying the location of the user device (e.g., based on a current time corresponding to a time for which the particular task is scheduled).

In some implementations, the crowdsource platform may schedule performance of tasks based on sensor data (e.g., weather forecast data, time of day data, and/or the like). For example, if the sensor data indicates a snowstorm will cease after a particular time, the crowdsource platform may schedule the task of snow removal after the particular time. In some implementations, the crowdsource platform may determine a quantity of time the user device is located at the particular task location, and may adjust a task price based on the quantity of time. For example, if cleaning a first park takes thirty minutes and cleaning a second park takes four hours, the crowdsource platform may calculate the task prices differently for cleaning the first park and the second park.

As further shown in FIG. 1D, and by reference number 140, the crowdsource platform may determine that the identified location matches the particular task location. For example, the crowdsource platform may determine that the location of the user device is within a threshold distance from the particular task location. If the identified location does not match the particular task location (e.g., is not within the threshold distance), the crowdsource platform may provide a notification to the user indicating that the user is not in the correct location to perform the particular task, may refrain from capturing data associated with performance of the particular task, and/or the like. If the identified location matches the particular task location (e.g., is within the threshold distance), the crowdsource platform may proceed to capture data associated with performance of the particular task, as described below in connection with FIG. 1E.

As shown in FIG. 1E, and by reference number 145, the crowdsource platform may receive, from the user device, task image data identifying images of the particular task location. For example, the user device may include a camera, and the camera may capture images of the particular task location before, during, and/or after the particular task is performed by the user. An application provided on the user device may provide the task image data to the crowdsource platform. In some implementations, the user may cause the user device to capture the images and/or send the task image data to the crowdsource platform. The user device may capture the images and/or send the task image data periodically, based on an instruction received from the user, based on information received from the crowdsource platform or an application associated with the crowdsource platform, and/or the like.

As further shown in FIG. 1E, and by reference number 150, the crowdsource platform may access camera data, identifying images of the particular task location, from cameras identified as associated with the particular task location. The crowdsource platform may access camera data captured before the user begins to perform the particular task, during performance of the particular task by the user, and/or after the user completes the particular task. In some implementations, the crowdsource platform may receive, store, and/or access the camera data periodically, based on times and/or time intervals specified by the crowdsource platform, and/or the like.

In some implementations, the crowdsource platform may access and/or store only a portion of the camera data. For example, the crowdsource platform may receive, store, and/or access camera data captured at time intervals that are less frequent than the camera captures images of the particular task location. In some implementations, the crowdsource platform may limit or reduce the camera data to include only camera data that relates to the particular task. For example, when the particular task is performed in a smaller physical area smaller than an overall physical area captured by a camera, the crowdsource platform may limit the camera data to data associated with the smaller physical area.

In some implementations, the crowdsource platform may access, from the cameras, other camera data identifying images not associated with the particular task location, and may filter the other camera data from the camera data. For example, the other camera data may be associated with crime detection or other purposes not related to determining performance of the particular task, and may not be stored, processed, and/or the like by the crowdsource platform when determining performance of the particular task. In this way, the crowdsource platform may conserve computing resources (e.g., processing resources, memory resources, network resources, and/or the like) that would otherwise be wasted storing, processing, communicating, and/or the like data unrelated to performance of the particular task.

Figure 1F:
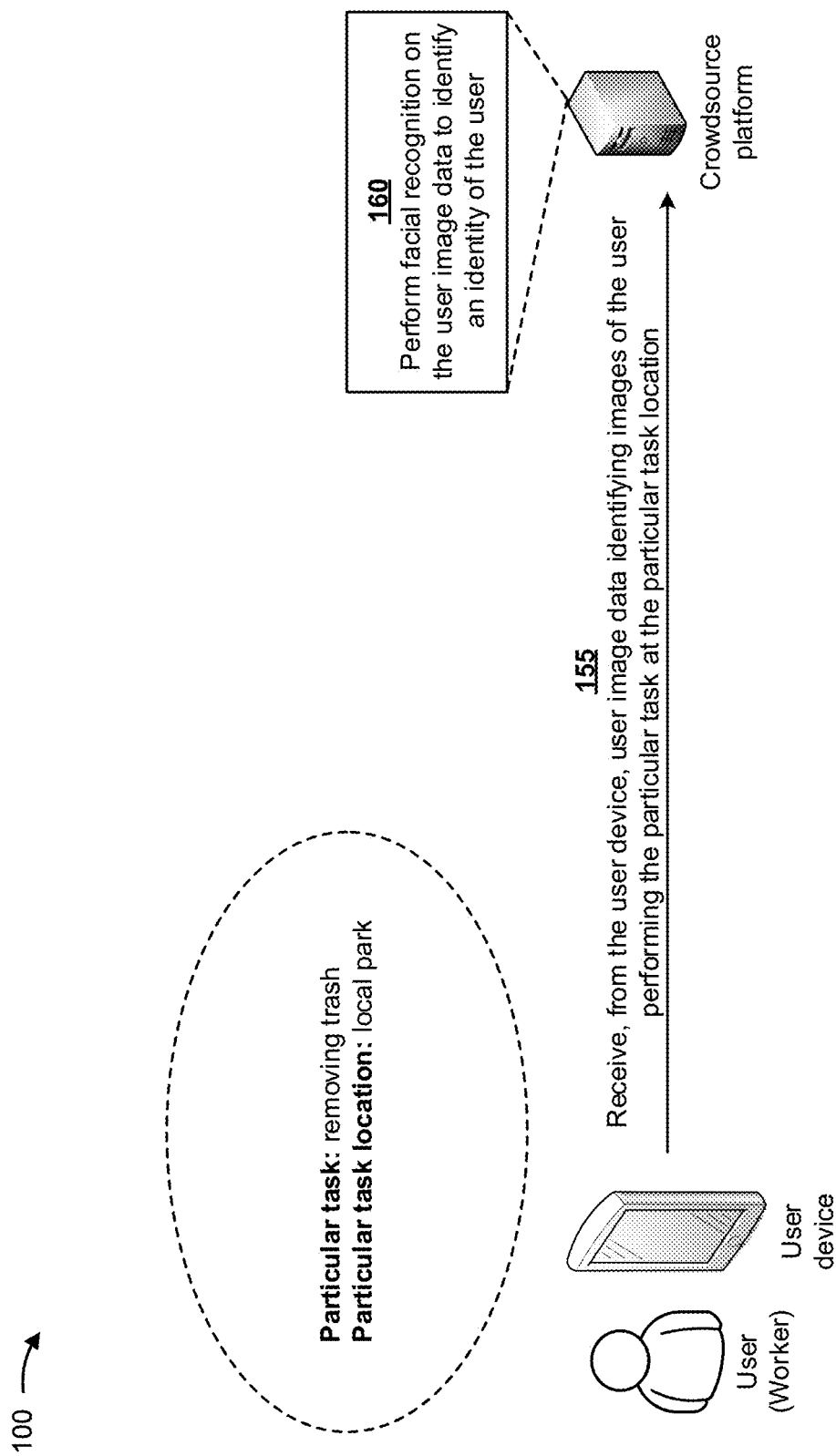

As shown in FIG. 1F, and by reference number 155, the crowdsource platform may receive, from the user device, user image data identifying images of the user performing the particular task at the particular task location. The user image data may include data identifying the particular task location before the user begins performing the particular task, while the user is performing the particular task, after the user completes performance of the particular task, and/or the like.

As further shown in FIG. 1F, and by reference number 160, the crowdsource platform may perform facial recognition on the user image data to identify an identity of the user. In this way, the crowdsource platform may ensure that the user performing the particular task is the user who will receive the funds for performing the particular task. Additionally, or alternatively, the crowdsource platform may obtain other information identifying the user (e.g., an account number, a personal identification number, and/or the like associated with the user by the crowdsource platform), may obtain an image that identifies the user (e.g., a scan of the user's driver's license, a barcode, and/or the like), and/or the like. The crowdsource platform may obtain the other information prior to performance of the particular task, during performance of the particular task, after performance of the particular task, and/or the like.

As shown in FIG. 1G, and by reference number 165, the crowdsource platform may process the task image data and the camera data, with a machine learning model, to determine performance data identifying what was performed for the particular task, how much of the particular task was performed, particular funds available for the particular task, an amount of money to pay the user, and/or the like. For example, for a task requiring removal of trash from a particular task location, the crowdsource platform may determine that the user only removed approximately half of the trash at the particular task location, and may notify the user that the user will not be paid until the task is completed. Alternatively, the crowdsource platform may determine to pay, to the user, half of the funds that would be paid for completing the entire task.

In some implementations, the machine learning model may include a neural network classifier model, a long short-term memory (LSTM) model, a reinforcement learning model, and/or the like. In some implementations, the crowdsource platform may utilize the machine learning model to automatically create a list of tasks to perform, to automatically identify users to which to provide task notifications, to automatically determine whether tasks were performed to completion, and/or the like.

In some implementations, the machine learning model may be trained, with historical task image data and historical camera data associated with performance of tasks, to determine predicted performance data. The crowdsource platform may train the machine learning model by separating the historical task image data and the historical camera data into a training set, a validation set, a test set, and/or the like. The training set may be utilized to train the machine learning model. The validation set may be utilized to validate results of the trained machine learning model. The test set may be utilized to test operation of the machine learning model.

In some implementations, the crowdsource platform may train the machine learning model using, for example, an unsupervised training procedure and based on the historical task image data and the historical camera data. For example, the crowdsource platform may perform dimensionality reduction to reduce the historical task image data and the historical camera data to a minimum feature set, thereby reducing resources (e.g., processing resources, memory resources, and/or the like) to train the machine learning model, and may apply a classification technique to the minimum feature set.

In some implementations, the crowdsource platform may use a logistic regression classification technique to determine a categorical outcome (e.g., what was performed for a particular task, how much of the particular task was performed, particular funds available for the particular task, an amount of money to pay the user, and/or the like). Additionally, or alternatively, the crowdsource platform may use a naïve Bayesian classifier technique. In this case, the crowdsource platform may perform binary recursive partitioning to split the historical task image data and historical camera data into partitions and/or branches and use the partitions and/or branches to determine outcomes (e.g., what was performed for a particular task, how much of the particular task was performed, particular funds available for the particular task, an amount of money to pay the user, and/or the like). Based on using recursive partitioning, the crowdsource platform may reduce utilization of computing resources relative to manual, linear sorting and analysis of data points, thereby enabling use of thousands, millions, or billions of data points to train the machine learning model, which may result in a more accurate model than using fewer data points. Additionally, or alternatively, the crowdsource platform may use a support vector machine (SVM) classifier technique to generate a non-linear boundary between data points in the training set. In this case, the non-linear boundary is used to classify test data into a particular class.

Additionally, or alternatively, the crowdsource platform may train the machine learning model using a supervised training procedure that includes receiving input to the machine learning model from a subject matter expert, which may reduce an amount of time, an amount of processing resources, and/or the like to train the machine learning model relative to an unsupervised training procedure.

In some implementations, the crowdsource platform may use one or more other model training techniques, such as a neural network technique, a latent semantic indexing technique, and/or the like. For example, the crowdsource platform may perform an artificial neural network processing technique (e.g., using a two-layer feedforward neural network architecture, a three-layer feedforward neural network architecture, and/or the like) to perform pattern recognition with regard to patterns of the historical task image data and the historical camera data. In this case, using the artificial neural network processing technique may improve an accuracy of the trained machine learning model generated by the crowdsource platform by being more robust to noisy, imprecise, or incomplete data, and by enabling the crowdsource platform to detect patterns and/or trends undetectable to human analysts or systems using less complex techniques. In some implementations, the crowdsource platform may train the machine learning model, with the historical task image data and the historical camera data associated with performance of tasks, to determine the predicted performance data. Alternatively, the crowdsource platform may receive the machine learning model from another device that trains the machine learning model, with the historical task image data and the historical camera data associated with performance of tasks, to determine the predicted performance data.

In some implementations, the machine learning model may additionally determine a level of quality of performance of the task (e.g., based on a portion of the task that is completed, an amount of time within which the task is completed, and/or the like), and may assign a rating to the user based on the determined level of quality. The crowdsource platform may maintain an overall rating for a user based on ratings determined for one or more tasks performed by the user (e.g., an average of the ratings for each task performed, a weighted average of the ratings for each task performed, and/or the like). Additionally, or alternatively, the crowdsource platform may assign one or more specific ratings to the user (e.g., based on the type of task performed). The crowdsource platform may factor in the overall rating and/or specific ratings of the user in determining whether to propose tasks to be performed by the user in the future, whether to select the user to perform tasks in the future, and/or the like. For example, if the crowdsource platform solicits bids from multiple users, as described above in connection with FIG. 1B, the crowdsource platform may award performance of the task based on a combination of the ratings of the users, the amount of money bid by the users, and/or the like.

In some implementations, the crowdsource platform may determine whether to push a task notification to user devices based on profiles of users associated with the user devices. The user profiles may be registered with the crowdsource platform and, as the users perform tasks (e.g., successfully and unsuccessfully), the crowdsource platform may learn more about the users. For example, the crowdsource platform may determine users that are reliable and good at particular types of tasks and may push the task notifications out to such users.

Figure 1H:
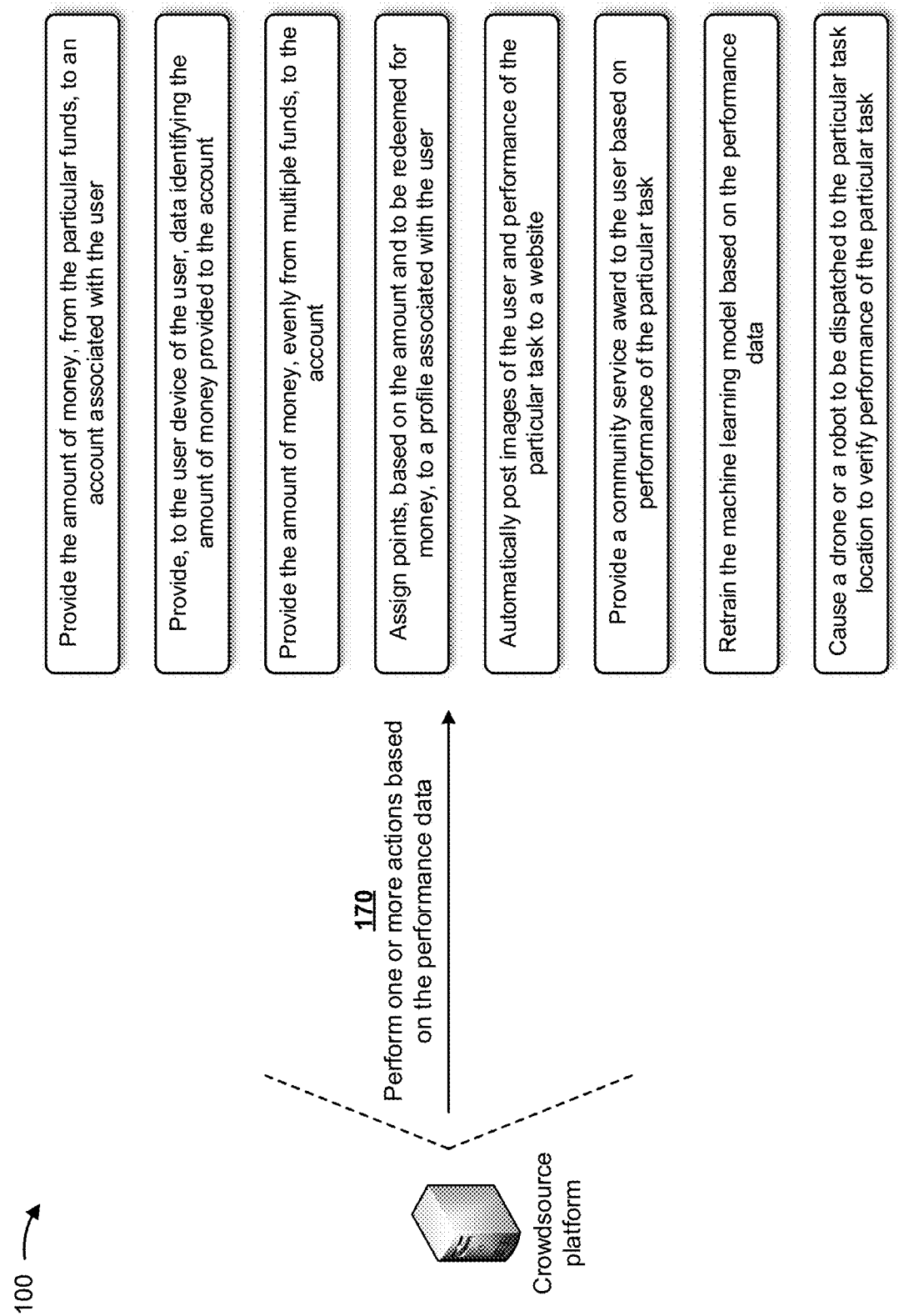

As shown in FIG. 1H, and by reference number 170, the crowdsource platform may perform one or more actions based on the performance data. The one or more actions may include providing the amount of money, from the particular funds, to an account associated with the user. For example, the crowdsource platform may cause funds, in the determined amount of money, to be transferred to an account associated with the user, may credit an account of the user, and/or the like. In this way, the user may be compensated automatically, which may improve speed and efficiency of the process and conserve computing resources (e.g., processing resources, memory resources, and/or the like), network resources, and/or the like.

The one or more actions may include providing, to the user device of the user, data identifying the amount of money provided to the account. For example, the crowdsource platform may cause data identifying the amount of money provided to the account to be communicated to an application of the user device that is associated with the crowdsource platform. Additionally, or alternatively, the crowdsource platform may cause a text message, an email, a voicemail, and/or the like, that includes the data identifying the amount of money provided to the account, to be sent to the user device of the user. In this way, the user may be automatically notified.

The one or more actions may include providing the amount of money, evenly from multiple funds, to the account. Alternatively, the crowdsource platform may prioritize funds (e.g., based on an amount of funds provided), may use funds allocated for a specific purpose prior to using general funds, may spread funds based on a specified distribution (e.g., evenly) across different types of tasks, different tasks, different task locations, and/or the like. In this way, the funds may be distributed automatically, which may remove human subjectivity and waste from the process, and which may improve speed and efficiency of the process and conserve computing resources, network resources, and/or the like.

The one or more actions may include assigning points, based on the amount and to be redeemed for money, to a profile associated with the user. In some implementations, the crowdsource platform may cause information indicating the assigned points to be communicated to an application on the user device that is associated with the crowdsource platform and/or may cause information indicating the assigned points to be communicated via a text message, an email, a voicemail, and/or the like. In this way, the user may perform more tasks in order to accumulate enough points to be redeemed for money, which may cause tasks to be performed more quickly and efficiently.

The one or more actions may include automatically posting images of the user and performance of the particular task to a website. For example, the crowdsource platform may post images of the user that were captured during performance of the particular task, may post images of the user, that were previously provided by the user, in association with performance of the task, and/or the like. In this way, the crowdsource platform may automatically reward and incentivize the user to perform additional tasks, which may improve the speed and efficiency associated with performing the additional tasks.

The one or more actions may include providing a community service award to the user based on performance of the particular task. In this way, the crowdsource platform may automatically reward and incentivize the user to perform additional tasks, which may improve the speed and efficiency associated with performing the additional tasks.

The one or more actions may include retraining the machine learning model based on the performance data. In this way, the crowdsource platform may improve the accuracy of the machine learning model in determining performance data identifying what was performed for the particular task, how much of the particular task was performed, particular funds available for the particular task, an amount of money to pay the user, and/or the like, which may improve speed and efficiency of the machine learning model and conserve computing resources, network resources, and/or the like.

The one or more actions may include causing a drone or a robot to be dispatched to the particular task location to verify performance of the particular task. In this way, the crowdsource platform may automatically provide resources necessary to confirm performance of the particular task, which may improve speed and efficiency of the process and conserve computing resources, network resources, and/or the like.

In some implementations, the crowdsource platform may identify anomalies in the performance data, and modify the performance data based on the anomalies in the performance data. In some implementations, the crowdsource platform may identify the anomalies in the performance data, and may prevent an action, of the one or more actions, from being performed based on the anomalies in the performance data. In this way, the crowdsource platform may automatically improve the accuracy of determining the performance data, thereby improving identification of what was performed for the particular task, how much of the particular task was performed, particular funds available for the particular task, an amount of money to pay the user, and/or the like.

In this way, several different stages of the process for crowdsourcing funds for public services are automated via machine learning, which may remove human subjectivity and waste from the process, and which may improve speed and efficiency of the process and conserve computing resources (e.g., processing resources, memory resources, and/or the like), network resources, and/or the like. Furthermore, implementations described herein use a rigorous, computerized process to perform tasks or roles that were not previously performed or were previously performed using subjective human intuition or input. For example, currently there does not exist a technique that utilizes a machine learning model to crowdsource funds for public services. Finally, the process for crowdsourcing funds for public services conserves computing resources, network resources, and/or the like that would otherwise be wasted by inefficiently obtaining and/or allocating the funds, identifying and employing workers to perform the services, and/or the like.

As indicated above, FIGS. 1A-1H are provided merely as examples. Other examples may differ from what is described with regard to FIGS. 1A-1H.

Figure 2:
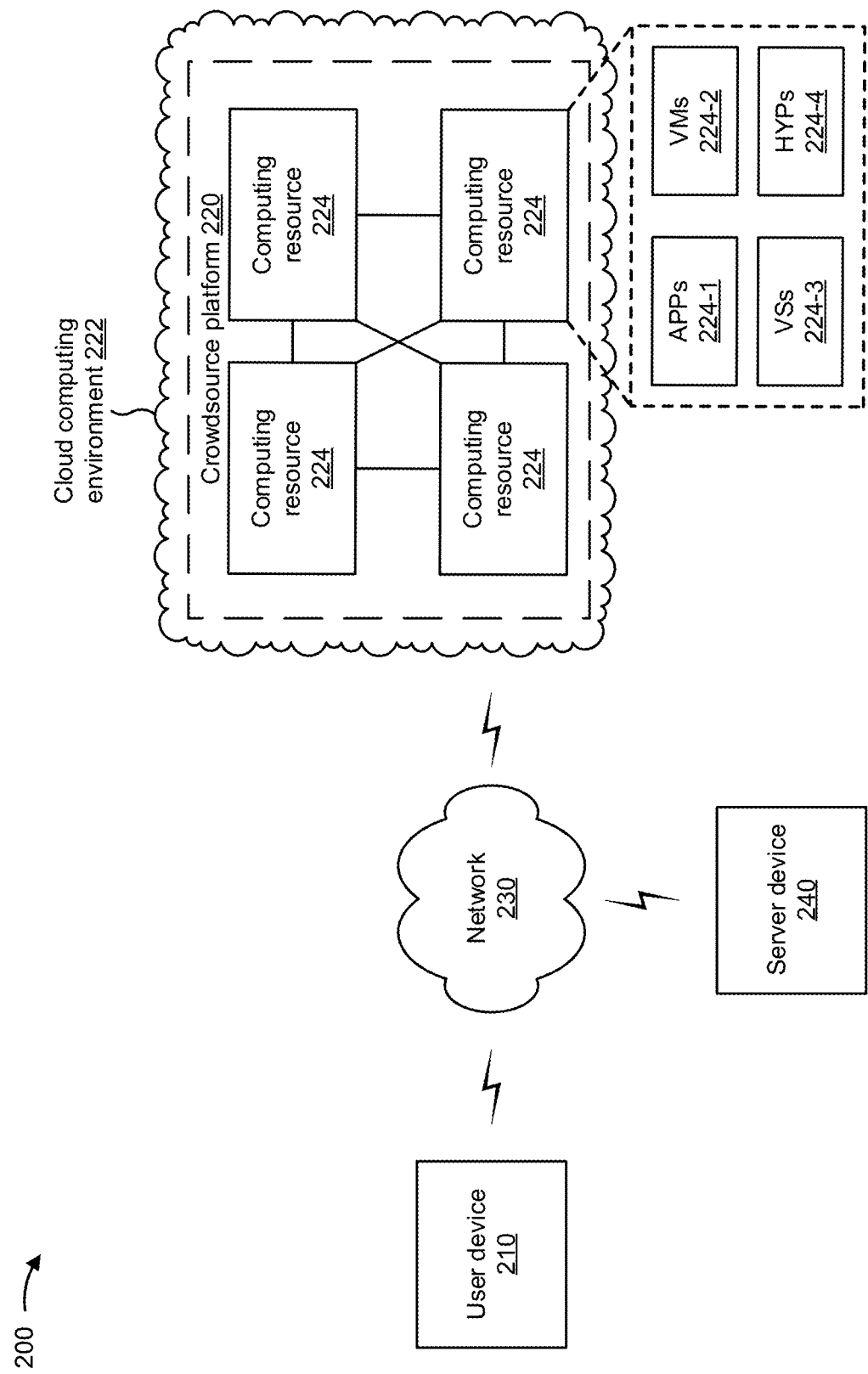
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a crowdsource platform 220, a network 230, and a server device 240. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), a camera (e.g., a security camera, a closed-circuit television (CCTV) camera, a smart camera, a satellite camera, etc.), or a similar type of device. In some implementations, user device 210 may receive information from and/or transmit information to crowdsource platform 220 and/or server device 240.

Crowdsource platform 220 includes one or more devices that may utilize a machine learning model to crowdsource funds for public services. In some implementations, crowdsource platform 220 may be modular such that certain software components may be swapped in or out depending on a particular need. As such, crowdsource platform 220 may be easily and/or quickly reconfigured for different uses.

In some implementations, crowdsource platform 220 may receive information from and/or transmit information to one or more user devices 210 and/or server devices 240.

In some implementations, as shown, crowdsource platform 220 may be hosted in a cloud computing environment 222. Notably, while implementations described herein describe crowdsource platform 220 as being hosted in cloud computing environment 222, in some implementations, crowdsource platform 220 may be non-cloud-based (i.e., may be implemented outside of a cloud computing environment) or may be partially cloud-based.

Cloud computing environment 222 includes an environment that may host crowdsource platform 220. Cloud computing environment 222 may provide computation, software, data access, storage, etc. services that do not require end-user knowledge of a physical location and configuration of system(s) and/or device(s) that host crowdsource platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host crowdsource platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with crowdsource platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of user device 210 or an operator of crowdsource platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may provide administrators of the storage system with flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device, associated with a government agency, a financial institution, a social service organization, and/or the like. In some implementations, server device 240 may receive information from and/or transmit information to user device 210 and/or crowdsource platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device and/or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
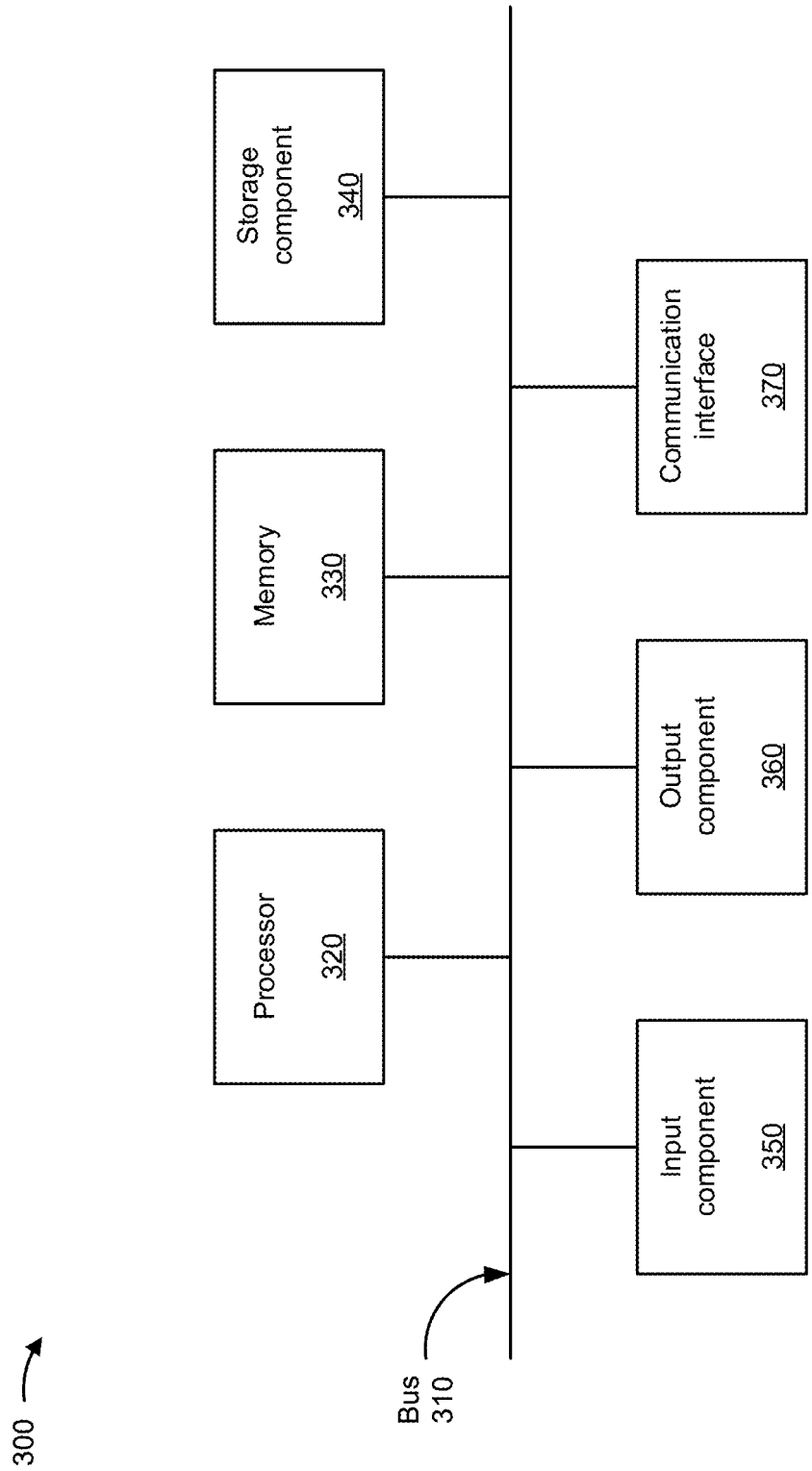
FIG. 3 is a diagram of example components of one or more devices of FIG. 2.

FIG. 3 is a diagram of example components of a device 300. Device 300 may correspond to user device 210, crowdsource platform 220, computing resource 224, and/or server device 240. In some implementations, user device 210, crowdsource platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
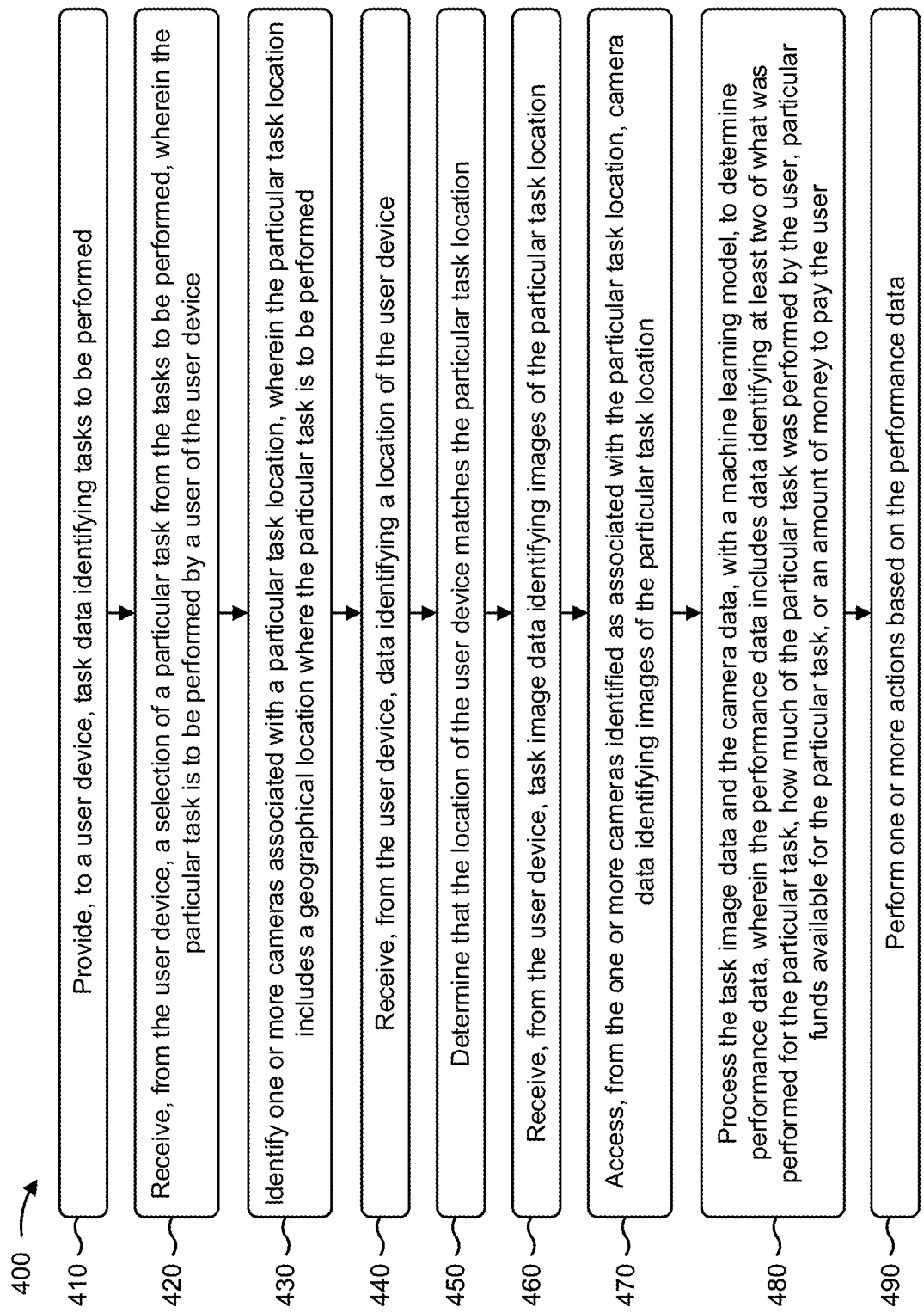
FIGS. 4-6 are flow charts of example processes for utilizing a machine learning model to crowdsource funds for public services.

FIG. 4 is a flow chart of an example process 400 for utilizing a machine learning model to crowdsource funds for public services. In some implementations, one or more process blocks of FIG. 4 may be performed by a crowdsource platform (e.g., crowdsource platform 220). In some implementations, one or more process blocks of FIG. 4 may be performed by another device or a group of devices separate from or including the crowdsource platform, such as a user device (e.g., user device 210) and/or a server device (e.g., server device 240).

As shown in FIG. 4, process 400 may include providing, to a user device, task data identifying tasks to be performed (block 410). For example, the crowdsource platform (e.g., using computing resource 224, processor 320, memory 330, communication interface 370, and/or the like) may provide, to a user device, task data identifying tasks to be performed, as described above.

As further shown in FIG. 4, process 400 may include receiving, from the user device, a selection of a particular task from the tasks to be performed, wherein the particular task is to be performed by a user of the user device (block 420). For example, the crowdsource platform (e.g., using computing resource 224, processor 320, storage component 340, communication interface 370, and/or the like) may receive, from the user device, a selection of a particular task from the tasks to be performed, as described above. In some implementations, the particular task may be performed by a user of the user device.

As further shown in FIG. 4, process 400 may include identifying one or more cameras associated with a particular task location, wherein the particular task location includes a geographical location where the particular task is to be performed (block 430). For example, the crowdsource platform (e.g., using computing resource 224, processor 320, memory 330, and/or the like) may identify one or more cameras associated with a particular task location, as described above. In some implementations, the particular task location may include a geographical location where the particular task is to be performed.

As further shown in FIG. 4, process 400 may include receiving, from the user device, data identifying a location of the user device (block 440). For example, the crowdsource platform (e.g., using computing resource 224, processor 320, communication interface 370, and/or the like) may receive, from the user device, data identifying a location of the user device, as described above.

As further shown in FIG. 4, process 400 may include determining that the location of the user device matches the particular task location (block 450). For example, the crowdsource platform (e.g., using computing resource 224, processor 320, storage component 340, and/or the like) may determine that the location of the user device matches the particular task location, as described above.

As further shown in FIG. 4, process 400 may include receiving, from the user device, task image data identifying images of the particular task location (block 460). For example, the crowdsource platform (e.g., using computing resource 224, processor 320, communication interface 370, and/or the like) may receive, from the user device, task image data identifying images of the particular task location, as described above.

As further shown in FIG. 4, process 400 may include accessing, from the one or more cameras identified as associated with the particular task location, camera data identifying images of the particular task location (block 470). For example, the crowdsource platform (e.g., using computing resource 224, processor 320, memory 330, communication interface 370, and/or the like) may access, from the one or more cameras identified as associated with the particular task location, camera data identifying images of the particular task location, as described above.

As further shown in FIG. 4, process 400 may include processing the task image data and the camera data, with a machine learning model, to determine performance data, wherein the performance data includes data identifying at least two of: what was performed for the particular task, how much of the particular task was performed by the user, particular funds available for the particular task, or an amount of money to pay the user (block 480). For example, the crowdsource platform (e.g., using computing resource 224, processor 320, storage component 340, and/or the like) may process the task image data and the camera data, with a machine learning model, to determine performance data, as described above. In some implementations, the performance data may include data identifying at least two of: what was performed for the particular task, how much of the particular task was performed by the user, particular funds available for the particular task, or an amount of money to pay the user.

As further shown in FIG. 4, process 400 may include performing one or more actions based on the performance data (block 490). For example, the crowdsource platform (e.g., using computing resource 224, processor 320, memory 330, storage component 340, communication interface 370, and/or the like) may perform one or more actions based on the performance data, as described above.

Process 400 may include additional implementations, such as any single implementation or any combination of implementations described below and/or in connection with one or more other processes described elsewhere herein.

In a first implementation, when performing the one or more actions, the crowdsource platform may provide the amount of money, from the particular funds, to an account associated with the user, may provide, to the user device, data identifying the amount of money provided to the account, may provide the amount of money, evenly from multiple funds, to the account, and/or the like.

In a second implementation, alone or in combination with the first implementation, when performing the one or more actions, the crowdsource platform may assign points, based on the amount and to be redeemed for money, to a profile associated with the user, may post images of the user and performance of the particular task to a website, may provide a community service award to the user based on performance of the particular task, may retrain the machine learning model based on the performance data, and/or the like.

In a third implementation, alone or in combination with one or more of the first and second implementations, the crowdsource platform may provide, to a plurality of user devices, the task data identifying the tasks to be performed; may receive, from the plurality of user devices and based on the task data, funding data associated with performance of the tasks, wherein the funding data may identify funds to allocate for performance of the tasks; and may receive, from one or more server devices, the funds based on the funding data.

In a fourth implementation, alone or in combination with one or more of the first through third implementations, the crowdsource platform may receive user image data identifying the user performing the particular task at the particular task location, and may perform facial recognition on the user image data to identify an identity of the user.

In a fifth implementation, alone or in combination with one or more of the first through fourth implementations, the crowdsource platform may train the machine learning model, with historical task image data and historical camera data associated with performance of a plurality of tasks, to determine predicted performance data; or may receive the machine learning model from another device, wherein the machine learning model may be trained by the other device.

In a sixth implementation, alone or in combination with one or more of the first through fifth implementations, the crowdsource platform may receive, from the user device, information indicating particular tasks that the user is willing to perform; may provide, to the user device, the task data identifying the tasks to be performed includes; and may provide, to the user device, the task data identifying the tasks to be performed based on the information indicating the particular tasks that the user is willing to perform.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
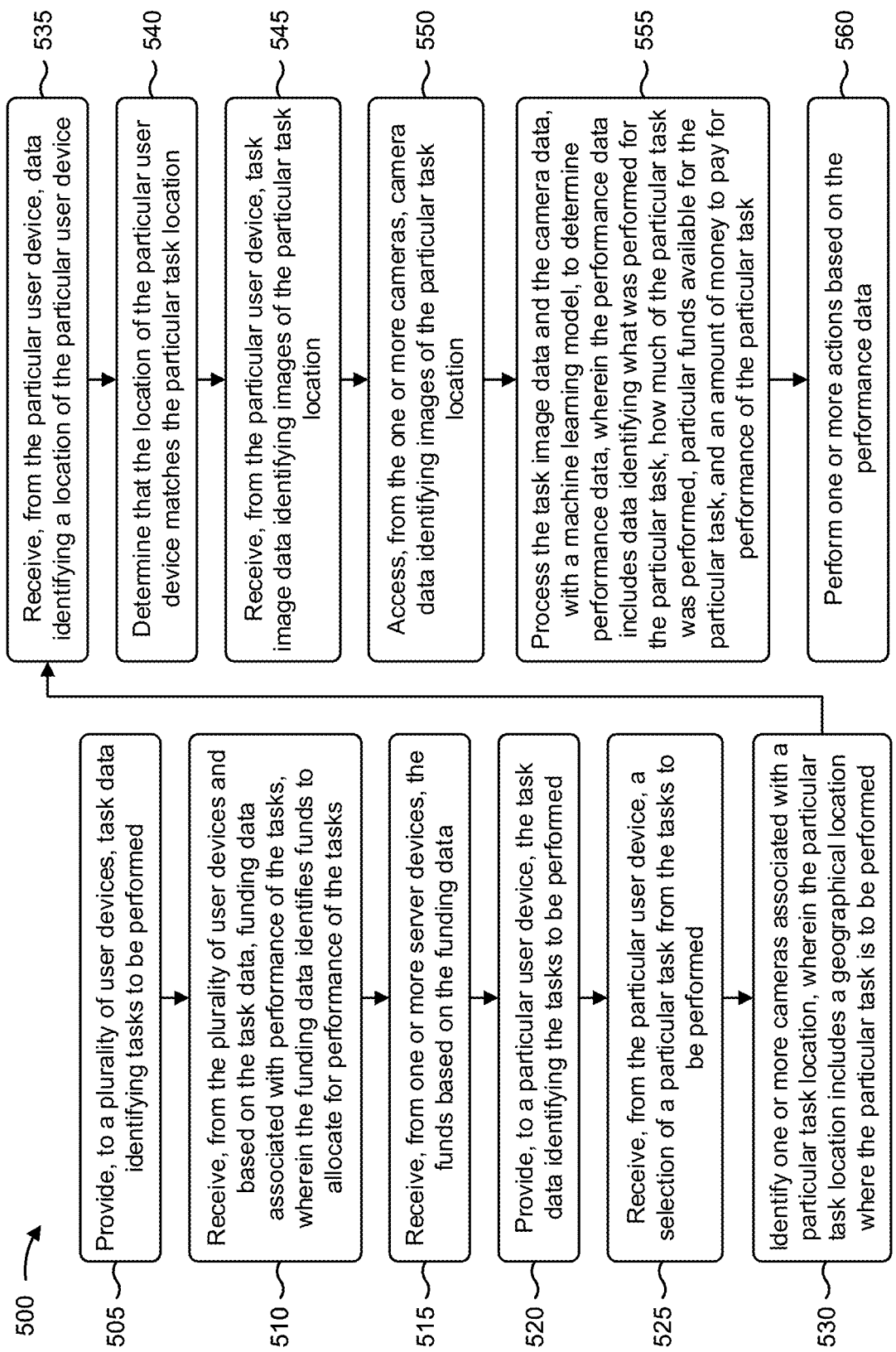

FIG. 5 is a flow chart of an example process 500 for utilizing a machine learning model to crowdsource funds for public services. In some implementations, one or more process blocks of FIG. 5 may be performed by a crowdsource platform (e.g., crowdsource platform 220). In some implementations, one or more process blocks of FIG. 5 may be performed by another device or a group of devices separate from or including the crowdsource platform, such as a user device (e.g., user device 210) and/or a server device (e.g., server device 240).

As shown in FIG. 5, process 500 may include providing, to a plurality of user devices, task data identifying tasks to be performed (block 505). For example, the crowdsource platform (e.g., using computing resource 224, processor 320, communication interface 370, and/or the like) may provide, to a plurality of user devices, task data identifying tasks to be performed, as described above.

As further shown in FIG. 5, process 500 may include receiving, from the plurality of user devices and based on the task data, funding data associated with performance of the tasks, wherein the funding data identifies funds to allocate for performance of the tasks (block 510). For example, the crowdsource platform (e.g., using computing resource 224, processor 320, communication interface 370, and/or the like) may receive, from the plurality of user devices and based on the task data, funding data associated with performance of the tasks, as described above. In some implementations, the funding data may identify funds to allocate for performance of the tasks.

As further shown in FIG. 5, process 500 may include receiving, from one or more server devices, the funds based on the funding data (block 515). For example, the crowdsource platform (e.g., using computing resource 224, processor 320, communication interface 370, and/or the like)

may receive, from one or more server devices, the funds based on the funding data, as described above.

As further shown in FIG. 5, process 500 may include providing, to a particular user device, the task data identifying the tasks to be performed (block 520). For example, the crowdsource platform (e.g., using computing resource 224, processor 320, communication interface 370, and/or the like) may provide, to a particular user device, the task data identifying the tasks to be performed, as described above.

As further shown in FIG. 5, process 500 may include receiving, from the particular user device, a selection of a particular task from the tasks to be performed (block 525). For example, the crowdsource platform (e.g., using computing resource 224, processor 320, memory 330, communication interface 370, and/or the like) may receive, from the particular user device, a selection of a particular task from the tasks to be performed, as described above.

As further shown in FIG. 5, process 500 may include identifying one or more cameras associated with a particular task location, wherein the particular task location includes a geographical location where the particular task is to be performed (block 530). For example, the crowdsource platform (e.g., using computing resource 224, processor 320, storage component 340, and/or the like) may identify one or more cameras associated with a particular task location and wherein the particular task location includes a geographical location, as described above. In some implementations, the particular task location may include a geographical location where the particular task is to be performed.

As further shown in FIG. 5, process 500 may include receiving, from the particular user device, data identifying a location of the particular user device (block 535). For example, the crowdsource platform (e.g., using computing resource 224, processor 320, storage component 340, communication interface 370, and/or the like) may receive, from the particular user device, data identifying a location of the particular user device, as described above.

As further shown in FIG. 5, process 500 may include determining that the location of the particular user device matches the particular task location (block 540). For example, the crowdsource platform (e.g., using computing resource 224, processor 320, memory 330, and/or the like) may determine that the location of the particular user device matches the particular task location, as described above.

As further shown in FIG. 5, process 500 may include receiving, from the particular user device, task image data identifying images of the particular task location (block 545). For example, the crowdsource platform (e.g., using computing resource 224, processor 320, communication interface 370, and/or the like) may receive, from the particular user device, task image data identifying images of the particular task location, as described above.

As further shown in FIG. 5, process 500 may include accessing, from the one or more cameras, camera data identifying images of the particular task location (block 550). For example, the crowdsource platform (e.g., using computing resource 224, processor 320, memory 330, communication interface 370, and/or the like) may access, from the one or more cameras, camera data identifying images of the particular task location, as described above.

As further shown in FIG. 5, process 500 may include processing the task image data and the camera data, with a machine learning model, to determine performance data, wherein the performance data includes data identifying what was performed for the particular task, how much of the particular task was performed, particular funds available for the particular task, and an amount of money to pay for performance of the particular task (block 555). For example, the crowdsource platform (e.g., using computing resource 224, processor 320, memory 330, and/or the like) may process the task image data and the camera data, with a machine learning model, to determine performance data, as described above. In some implementations, the performance data may include data identifying what was performed for the particular task, how much of the particular task was performed, particular funds available for the particular task, and an amount of money to pay for performance of the particular task.

As further shown in FIG. 5, process 500 may include performing one or more actions based on the performance data (block 560). For example, the crowdsource platform (e.g., using computing resource 224, processor 320, memory 330, storage component 340, communication interface 370, and/or the like) may perform one or more actions based on the performance data, as described above.

Process 500 may include additional implementations, such as any single implementation or any combination of implementations described below and/or in connection with one or more other processes described elsewhere herein.

In a first implementation, the crowdsource platform may access, from the one or more cameras and with the camera data, other camera data identifying images not associated with the particular task location; and may filter the other camera data from the camera data.

In a second implementation, alone or in combination with the first implementation, the crowdsource platform may identify anomalies in the performance data, and may modify the performance data based on the anomalies in the performance data.

In a third implementation, alone or in combination with one or more of the first and second implementations, the crowdsource platform may identify anomalies in the performance data, and may prevent an action, of the one or more actions, from being performed based on the anomalies in the performance data.

In a fourth implementation, alone or in combination with one or more of the first through third implementations, the crowdsource platform may cause a drone or a robot to be dispatched to the particular task location, to verify performance of the particular task, before performing the one or more actions.

In a fifth implementation, alone or in combination with one or more of the first through fourth implementations, when performing the one or more actions, the crowdsource platform may cause a drone or a robot to be dispatched to the particular task location to verify performance of the particular task.

In a sixth implementation, alone or in combination with one or more of the first through fifth implementations, the crowdsource platform may evenly allocate the funds for the tasks to be performed, or prioritize the funds, based on amounts in the funds, for the tasks to be performed.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
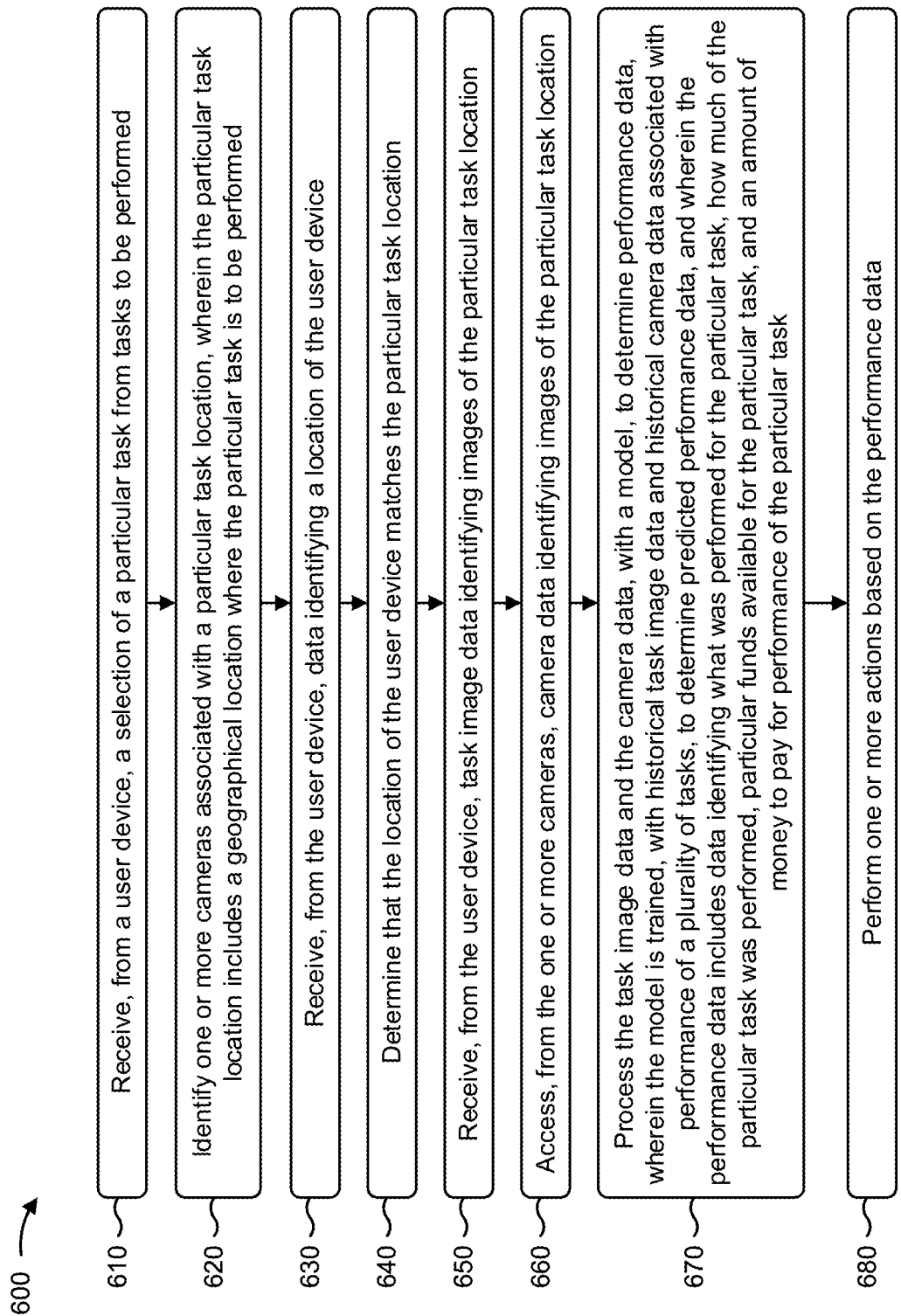

FIG. 6 is a flow chart of an example process 600 for utilizing a machine learning model to crowdsource funds for public services. In some implementations, one or more process blocks of FIG. 6 may be performed by a crowdsource platform (e.g., crowdsource platform 220). In some implementations, one or more process blocks of FIG. 6 may be performed by another device or a group of devices separate from or including the crowdsource platform, such as a user device (e.g., user device 210) and/or a server device (e.g., server device 240).

As shown in FIG. 6, process 600 may include receiving, from a user device, a selection of a particular task from tasks to be performed (block 610). For example, the crowdsource platform (e.g., using computing resource 224, processor 320, communication interface 370, and/or the like) may receive, from a user device, a selection of a particular task from tasks to be performed, as described above.

As further shown in FIG. 6, process 600 may include identifying one or more cameras associated with a particular task location, wherein the particular task location includes a geographical location where the particular task is to be performed (block 620). For example, the crowdsource platform (e.g., using computing resource 224, processor 320, memory 330, and/or the like) may identify one or more cameras associated with a particular task location, as described above. In some implementations, the particular task location may include a geographical location where the particular task is to be performed.

As further shown in FIG. 6, process 600 may include receiving, from the user device, data identifying a location of the user device (block 630). For example, the crowdsource platform (e.g., using computing resource 224, processor 320, communication interface 370, and/or the like) may receive, from the user device, data identifying a location of the user device, as described above.

As further shown in FIG. 6, process 600 may include determining that the location of the user device matches the particular task location (block 640). For example, the crowdsource platform (e.g., using computing resource 224, processor 320, storage component 340, and/or the like) may determine that the location of the user device matches the particular task location, as described above.

As further shown in FIG. 6, process 600 may include receiving, from the user device, task image data identifying images of the particular task location (block 650). For example, the crowdsource platform (e.g., using computing resource 224, processor 320, communication interface 370, and/or the like) may receive, from the user device, task image data identifying images of the particular task location, as described above.

As further shown in FIG. 6, process 600 may include accessing, from the one or more cameras, camera data identifying images of the particular task location (block 660). For example, the crowdsource platform (e.g., using computing resource 224, processor 320, memory 330, communication interface 370, and/or the like) may access, from the one or more cameras, camera data identifying images of the particular task location, as described above.

As further shown in FIG. 6, process 600 may include processing the task image data and the camera data, with a model, to determine performance data, wherein the model is trained, with historical task image data and historical camera data associated with performance of a plurality of tasks, to determine predicted performance data, and wherein the performance data includes data identifying what was performed for the particular task, how much of the particular task was performed, particular funds available for the particular task, and an amount of money to pay for performance of the particular task (block 670). For example, the crowdsource platform (e.g., using computing resource 224, processor 320, memory 330, and/or the like) may process the task image data and the camera data, with a model, to determine performance data, as described above. In some implementations, the model may be trained, with historical task image data and historical camera data associated with performance of a plurality of tasks, to determine predicted performance data. In some implementations, the performance data may include data identifying what was performed for the particular task, how much of the particular task was performed, particular funds available for the particular task, and an amount of money to pay for performance of the particular task.

As further shown in FIG. 6, process 600 may include performing one or more actions based on the performance data (block 680). For example, the crowdsource platform (e.g., using computing resource 224, processor 320, memory 330, storage component 340, communication interface 370, and/or the like) may perform one or more actions based on the performance data, as described above.

Process 600 may include additional implementations, such as any single implementation or any combination of implementations described below and/or in connection with one or more other processes described elsewhere herein.

In a first implementation, when performing the one or more actions, the crowdsource platform may cause a drone or a robot to be dispatched to the particular task location to verify performance of the particular task, may provide the amount of money, from the particular funds, to an account associated with the user, may provide, to the user device, data identifying the amount of money provided to the account, or may provide the amount of money, evenly from multiple funds, to the account.

In a second implementation, alone or in combination with the first implementation, when performing the one or more actions, the crowdsource platform may assign points, based on the amount and to be redeemed for money, to a profile associated with the user, may post images of the user and performance of the particular task to a website, may provide a community service award to the user based on performance of the particular task, or may retrain the model based on the performance data.

In a third implementation, alone or in combination with one or more of the first and second implementations, the crowdsource platform may receive, from the user device, user image data identifying a person performing the particular task at the particular task location, and may perform facial recognition on the user image data to identify an identity of the person.

In a fourth implementation, alone or in combination with one or more of the first through third implementations, the crowdsource platform may receive, from the user device, information indicating particular tasks that the user is willing to perform, and may provide, to the user device, the task data identifying the tasks to be performed based on the information indicating the particular tasks that the user is willing to perform, wherein the tasks to be performed match the particular tasks that the user is willing to perform.

In a fifth implementation, alone or in combination with one or more of the first through fourth implementations, the crowdsource platform may identify anomalies in the performance data, and may prevent an action, of the one or more actions, from being performed based on the anomalies in the performance data.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device and from a user device, an indication of a particular task to be performed;
   receiving, by the device and from the user device, data identifying a location of the user device;
   determining, by the device, that the location of the user device is associated with the particular task;
   receiving, by the device and from the user device, task image data identifying images of the particular task;
   processing, by the device, the task image data, with a machine learning model, to determine performance data,
      wherein the machine learning model is trained based on a neural network processing technique to perform pattern recognition with regard to patterns of historical task image data and historical completeness data, and
      wherein the performance data includes information indicating whether the particular task has been completed and a level of quality associated with the particular task based on the task image data;
   retraining, by the device, the machine learning model, based on the performance data to improve an accuracy of the machine learning model; and
   performing, by the device, one or more actions based on the performance data.

2. The method of claim 1, wherein receiving the indication of the particular task comprises:
   receiving an additional image associated with the particular task, and
   determining to authorize the particular task as a task to be performed.

3. The method of claim 1, wherein determining that the location of the user device is associated with the particular task comprises:
   determining that the location of the user device is within a threshold distance of a particular task location associated with the particular task.

4. The method of claim 1, wherein the task image data comprises data identifying one or more of:
   a particular task location associated with the particular task before a user begins performing the particular task,
   the particular task location while the user is performing the particular task, or
   the particular task location after the user completes performance of the particular task.

5. The method of claim 1, further comprising:
   determining, based on the task image data, an identity of a user associated with the particular task; and
   wherein performing the one or more actions is based on determining the identity of the user.

6. The method of claim 1, wherein the one or more actions include causing a drone or a robot to be dispatched to a particular task location associated with the particular task to verify performance of the particular task.

7. The method of claim 1, further comprising:
   identifying an anomaly in the performance data; and
   modifying the performance data based on the anomaly.

8. A device, comprising:
   one or more memories; and
   one or more processors, coupled to the one or more memories, configured to:
      receive, from a user device, an indication of a particular task to be performed;
      receive, from the user device, data identifying a location of the user device;
      determine that the location of the user device is associated with the particular task;
      receive, from the user device, task image data identifying images of the particular task;
      process the task image data, with a machine learning model, to determine performance data, wherein the machine learning model is trained based on a neural network processing technique to perform pattern recognition with regard to patterns of historical task image data and historical completeness data, and wherein the performance data includes information indicating whether the particular task has been completed and a level of quality associated with the particular task based on the task image data;

retrain the machine learning model based on the performance data to improve an accuracy of the machine learning model; and perform one or more actions based on the performance data.

9. The device of claim 8, wherein the one or more processors, when receiving the indication of the particular task, are configured to:

receive an additional image associated with the particular task, and determine to authorize the particular task as a task to be performed.

10. The device of claim 8, wherein the one or more processors, when determining that the location of the user device is associated with the particular task, are configured to:

determine that the location of the user device is within a threshold distance of a particular task location associated with the particular task.

11. The device of claim 8, wherein the task image data comprises data identifying one or more of:

a particular task location associated with the particular task before a user begins performing the particular task, the particular task location while the user is performing the particular task, or the particular task location after the user completes performance of the particular task.

12. The device of claim 8, wherein the one or more processors are further configured to:

determine, based on the task image data, an identity of a user associated with the particular task; and wherein performing the one or more actions is based on determining the identity of the user.

13. The device of claim 8, wherein the one or more processors, when performing the one or more actions, are configured to:

cause a drone or a robot to be dispatched to a particular task location associated with the particular task to verify performance of the particular task.

14. The device of claim 8, wherein the one or more processors are further configured to:

identify an anomaly in the performance data; and modify the performance data based on the anomaly.

15. A non-transitory computer-readable medium storing a set of instructions, the set of instructions comprising:

one or more instructions that, when executed by one or more processors of a device, cause the device to:

receive, from a user device, an indication of a particular task to be performed;

receive, from the user device, data identifying a location of the user device;

determine that the location of the user device is associated with the particular task;

receive, from the user device, task image data identifying images of the particular task;

process the task image data, with a machine learning model, to determine performance data, wherein the machine learning model is trained based on a neural network processing technique to perform pattern recognition with regard to patterns of historical task image data and historical completeness data, and wherein the performance data includes information indicating whether the particular task has been completed and a level of quality associated with the particular task based on the task image data;

retrain the machine learning model based on the performance data to improve an accuracy of the machine learning model; and perform one or more actions based on the performance data.

16. The non-transitory computer-readable medium of claim 15, wherein the one or more instructions, that cause the device to receive the indication of the particular task, cause the device to:

receive an additional image associated with the particular task, and determine to authorize the particular task as a task to be performed.

17. The non-transitory computer-readable medium of claim 15, wherein the one or more instructions, that cause the device to determine that the location of the user device is associated with the particular task, cause the device to:

determine that the location of the user device is within a threshold distance of a particular task location associated with the particular task.

18. The non-transitory computer-readable medium of claim 15, wherein the task image data comprises data identifying one or more of:

a particular task location associated with the particular task before a user begins performing the particular task, the particular task location while the user is performing the particular task, or the particular task location after the user completes performance of the particular task.

19. The non-transitory computer-readable medium of claim 15, wherein the one or more instructions further cause the device to:

determine, based on the task image data, an identity of a user associated with the particular task, and wherein performing the one or more actions is based on determining the identity of the user.

20. The non-transitory computer-readable medium of claim 15, wherein the one or more instructions further cause the device to:

identify an anomaly in the performance data; and modify the performance data based on the anomaly.

* * * * *